United States Patent

[11] 3,611,417

[72] Inventors Gerald F. Sauter;
Maynard C. Paul; Paul E. Oberg, all of Minneapolis, Minn.
[21] Appl. No. 846,207
[22] Filed July 30, 1969
[45] Patented Oct. 5, 1971
[73] Assignee Sperry Rand Corporation
New York, N.Y.

[54] HIGH-DENSITY MAGNETIC RECORDING METHOD
3 Claims, 10 Drawing Figs.

[52] U.S. Cl. .......... 346/74 M, 179/100.2 C, 340/174 TF, 340/174.1 F, 340/174.1 G, 346/74 MC
[51] Int. Cl. .......... G11b 5/02, G11b 5/16, G11b 5/30
[50] Field of Search .......... 346/74 M, 74 MC; 340/174 TF, 174.1 F; 179/100.2 C, 100.2 CB

[56] References Cited

UNITED STATES PATENTS

| | | | |
|---|---|---|---|
| 3,092,815 | 6/1963 | Hinze .......... | 346/74 MC |
| 3,320,597 | 5/1967 | Hart .......... | 340/174 TF |

OTHER REFERENCES

Ballantyne, J. M. Journal of Applied Physics Supplement to Vol. 33, No. 3 March 1962 " Domain Wall Storage and Logic" pp. 1067– 8. QCIJ82 in Patent Office Search Center.

*Primary Examiner*—Bernard Konick
*Assistant Examiner*—Howard W. Britton
*Attorneys*—Kenneth T. Grace and John P. Dority

ABSTRACT: A method of high-density magnetic recording using a magnetic recording head having a recording gap that is inductively coupled to a relatively moving thin-ferromagnetic-film recording medium of a thickness that is insufficient to support Bloch walls, i.e., can only support Neel walls, between adjacent domains and having an easy axis that is orthogonal to the direction of relative movement of, or parallel to, the recording gap. The recording medium's interdomain Neel walls are formed with the magnetization within the walls having the same directional rotational, i.e., winding, sense, e.g., clockwise or counterclockwise, by applying orthogonal fields $H_L$ and $H_T$ to the recording medium.

INVENTORS
PAUL E. OBERG
MAYNARD C. PAUL
GERALD F. SAUTER
BY Kenneth T. Grace
ATTORNEY

HIGH-DENSITY MAGNETIC RECORDING METHOD

BACKGROUND OF THE INVENTION

The invention herein described was made in the course of or under a contract or subcontract thereunder, with the Department of the Navy.

The present invention is considered to be an improvement to the high-density magnetic recording scheme of the patent application of C. H. Tolman et al. Ser. No. 755,186, filed Aug. 26, 1968 and assigned to the Sperry Rand Corporation as is the present invention. In that invention there is provided a scheme for achieving high-density magnetic recording using a magnetic recording head having a recording gap that is inductively coupled to a relatively moving thin-ferromagnetic-film recoding medium. The recording medium is of a thickness insufficient to support Block walls, i.e., can only support Neel walls, between adjacent domains and has an easy axis that is orthogonal to the direction of relative movement, i.e., transverse recording. The record medium's interdomain walls are formed with the magnetization within the walls having the same directional rotational, i.e., winding, sense, e.g. clockwise or counterclockwise, by applying orthogonal fields $H_L$ and $H_T$ in the recording gap. The $H_L$ field polarity, i.e., along the recording medium's easy axis, is of a first or a second and opposite polarity while the $H_T$ polarity, i.e., transverse to the recording medium easy axis, is of a corresponding first or a second and opposite polarity for causing the resultant field $H_R$ to rotate in the same winding sense during the generation of the interdomain walls. By utilizing Neel interdomain walls of the same winding sense, the walls are substantially nonannihilating, permitting high-density magnetic recording with magnetizable materials having small field-switching properties and are precisely positioned in the recording medium by the leading edge of the trailing pole piece as determined by the timing of the polarity reversal of the concurrently applied $H_L$ and $H_T$ field-generating current signals.

SUMMARY OF THE INVENTION

The present invention is directed toward a magnetic recording scheme for achieving high-density magnetic recording using a magnetic recording head having a recording gap that is inductively coupled to a relatively moving thin-ferromagnetic-film recording medium. As in the above-referenced C. H. Tolman et al. application, the recording medium utilized by the present invention is of a thickness insufficient to support Bloch walls, i.e., can only support Neel walls, between adjacent domains and has an easy axis that is orthogoanal to the direction of relative movement, i.e., transverse recording. The recording medium's interdomain walls are formed with the magnetization within the walls having the same directional rotational, i.e., winding, sense, e.g., clockwise or counterclockwise, by applying orthogonal fields $H_L$ and $H_T$ in the recording gap. The $H_L$ field polarity, i.e., the field along the recording medium's easy axis, is of a first or of a second and opposite polarity while the $H_T$ field polarity, i.e., the field transverse to the recording medium's easy axis, is of a corresponding first or of a second and opposite polarity for causing the resultant field $H_R$ to rotate in the same winding sense during the generation of the domain walls.

The present invention utilizes a recording head that is comprised of a conductor sandwiched between at least one U-shaped, or C-shaped, magnetizable layer. The conductor, at the open end of the U-shaped magnetizable layer, forms the gap width and the magnetizable layer width along the conductor forms the gap length, or a gap is etched as in the C-shaped configuration. The magnetizable layer portions on opposing sides of the conductor have easy axes that are equally skewed with respect to the recording face and transverse to each other. A current signal of a proper waveform coupled to the sandwiched conductor generates a rotating field in the recording gap whereby the recording medium's domain walls are formed with the magnetization within the walls having the same directional rotational sense.

DESCRIPTION OF THE PREFERRED EMBODIMENTS

Figure 1:
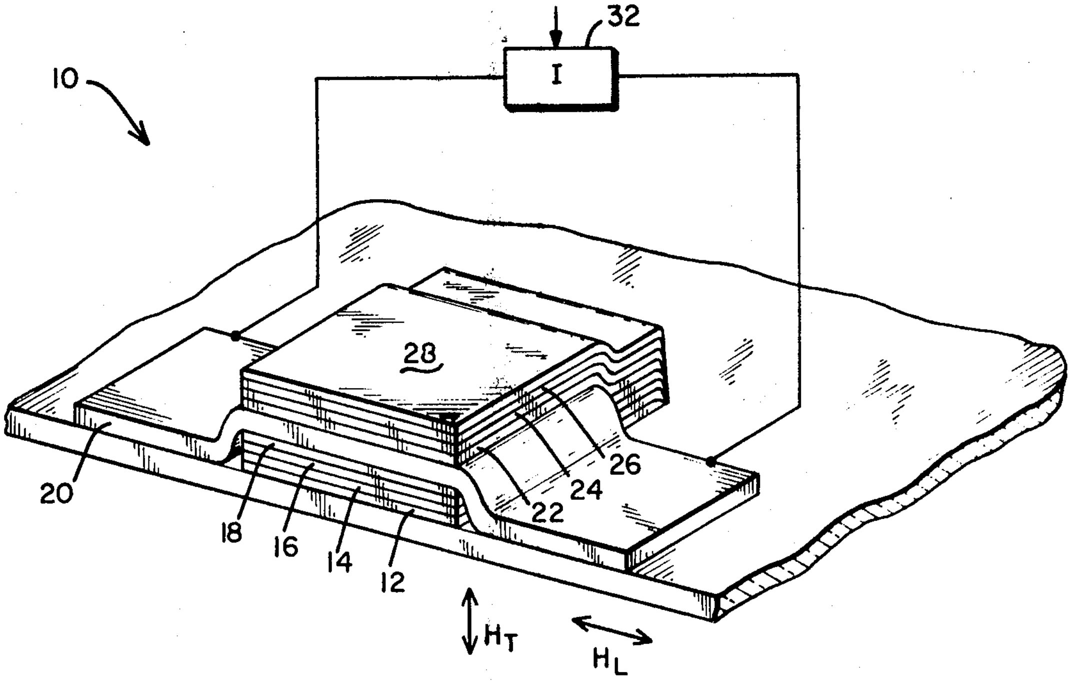
FIG. 1 is a perspective view of a magnetic recording head arrangement that may be utilized by the present invention.

With particular reference to FIG. 1 there is presented a perspective view of a magnetic recording head arrangement that may be utilized by the present invention. Recording head 10 essentially consists of the stacked, superposed arrangement of magnetizable layer 12, insulative layer 14, magnetizable layer 16, insulative layer 18, conductive layer 20, insulative layer 22, magnetizable layer 24, insulative layer 6, and magnetizable layer 28. Such layers are preferably formed in a continuous vapor deposition process such as that of the patent application of J. M. Gorres et al. Ser. No. 645,729, filed June 13, 1967 and now abandoned. The magnetizable and insulative layers and the conductive layer at the near side are lapped to form a smooth recording head surface with the recording head gap width, i.e., the distance between the opposing surfaces of magnetizable layers 16 and 24 along the recording head surface is thus determined by the thickness of layers 18, 20, and 22. The magnetizable and insulative layers at their superposed, overlapping portions farthest from the recording head surface form a mated-film portion for forming a substantially closed flux path of the superposed top magnetizable layers 24, 28 and the bottom magnetizable layers 12, 16. Thus the magnetizable layers may be considered to form a sandwiched U-shaped magnetizable element about the conductive layer 20.

Figure 2:
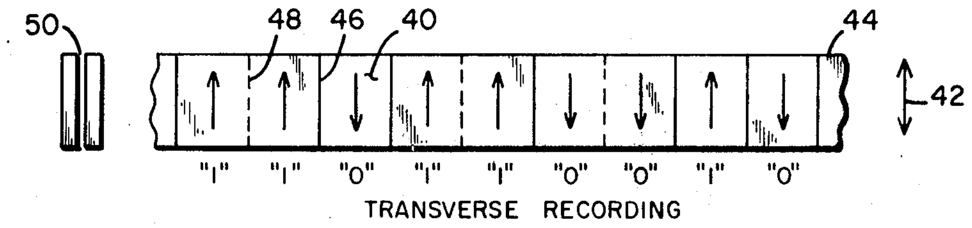
FIG. 2 is an illustration of domain magnetization polarizations for transverse recording system of the present invention.

With particular reference to FIG. 2 there is presented an illustration of the domain magnetization directions for the transverse recording system of the present invention. In the transverse recording system the domains 40 have their magnetization direction oriented in a first or a second and opposite direction along easy axis 42 of magnetic tape 44. Interdomain wall 46, between domains of opposite magnetization direction are, consequently, oriented substantially parallel to the easy axis 42 establishing walls of inherently relatively high stability. Interdomain wall 48 between domains of like magnetization polarization does not exist, with contiguous domains of like magnetization polarization constituting one large domain. The recording gap 50 is oriented parallel to the easy axis 42 of magnetic tape 44 whereby the overall system arrangement permits the recording gap 50 trailing edge to establish sharply defined interdomain wall 46 of high stability.

Figure 3:
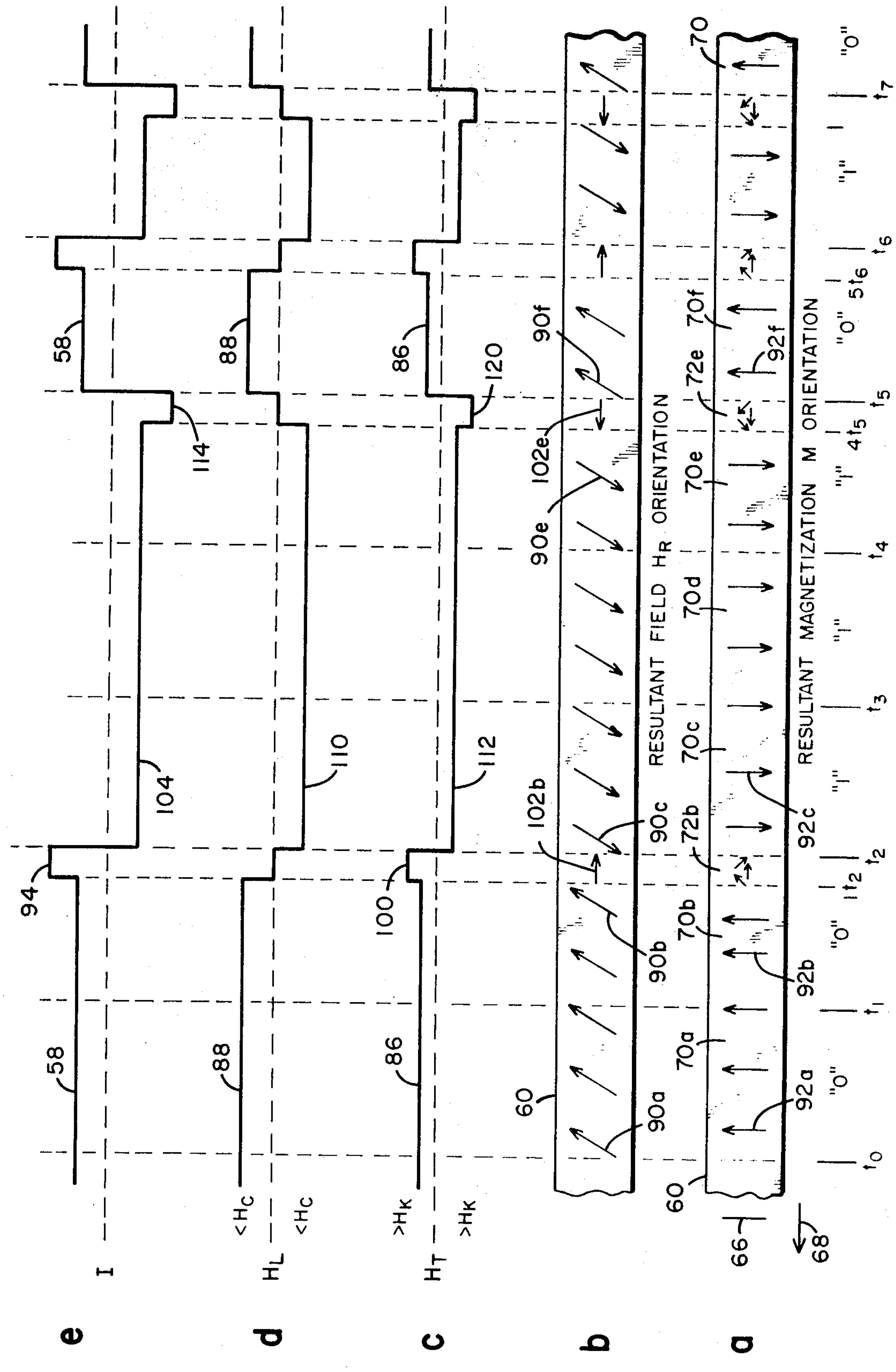
FIGS. 3*a*, 3*b*, 3*c*, 3*d*, 3*e* are illustrations of the waveforms of the drive current signal I and the resulting longitudinal $H_L$, transverse $H_T$ drive fields that provide the resultant field $H_R$ orientation and the resultant magnetization M orientation.

With particular reference to FIG. 3 there are presented the waveforms of the drive current signal I (FIG. 3*e*) coupled to conductive layer 20 which produces the drive fields $H_L$ which is well defined, and FIG. 3*d*), $H_T$ which is less well defined (FIG. 3*c*). These coacting drive fields $H_L$, $H_T$ in the gap of recording head 10, generate a resultant field $H_R$ (FIG. 3*b*) that rotates in the same winding sense during the generation of the interdomain walls in the magnetic tape 60. The drive field $H_R$, in turn, causes the resultant magnetization M orientation (FIG. 3*a*) to be established in the magnetic tape 60 for the writing of the digital information therein.

Figure 4:
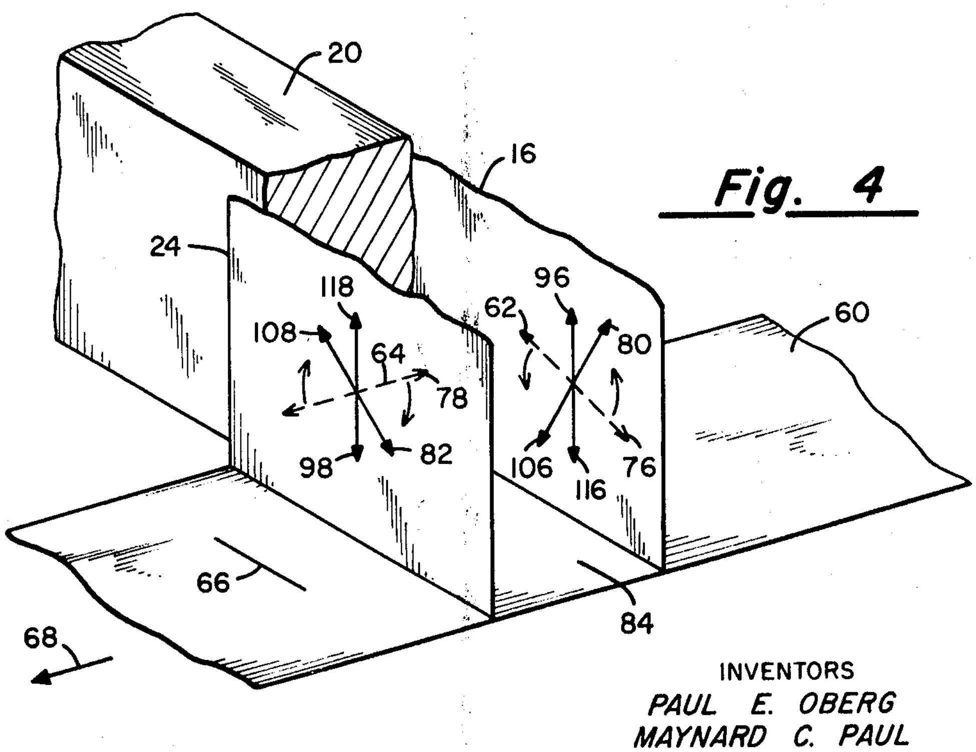
FIG. 4 is a diagrammatic illustration of the mechanism involved in generating the $H_L$, $H_T$ drive fields of the present invention.

With particular reference to FIG. 4 there is presented a diagrammatic illustration of the mechanism involved in the high-density magnetic recording scheme of the present invention.

For ease of discussion, FIG. 4 includes only magnetizable layer 16, conductive layer 20, magnetizable layer 24 and a suitable magnetic tape 60. Magnetizable layers 16, 24 are illustrated as having their respective easy axes 62, 64 oppositely skewed with respect to the recording head surface (and the surface of magnetic tape 60) and transverse but not necessarily orthogonal to each other. FIG. 3*a* depicts magnetic tape 60 as having an easy axis 66 and moving in the direction of arrow 68. Magnetic tape 60 may be considered to be of one track width having a plurality of domains 70 wherein the domains 70 of opposite magnetization polarization are separated by an interdomain Neel wall 72. As stated hereinabove, an essential element of the present invention involves establishing the magnetization with the interdomain Neel walls into the same winding sense. The convention illustrated is that of a uniform clockwise winding sense of the magnetization within the interdomain Neel walls to establish the magnetization direction in contiguous domains of opposite polarization along the easy axis 66.

The resultant field $H_R$ orientation of FIG. 3*b*, for establishing the corresponding resultant magnetization M orientation of FIG. 3*a* into magnetic tape 60, is established by the concurrently applied transverse drive field $H_T$ and longitudinal drive field $H_L$ of FIGS. 3*c*, 3*d*, respectively (the fields coupled to magnetic tape 60). In the discussed embodiment of the present invention, the transverse drive field $H_T$ and longitudinal drive field $H_L$ intensities are selected to be equal to or greater than $H_K$ (anisotropy field of the magnetic tape 60) and less than $H_C$ (the coercive force of the magnetic tape 60), respectively. Such relative field intensities may be of many various combinations the useful combinations dictated by the rotational switching threshold of the S. M. Rubens et al. U.S. Pat. No. 3,030,612 which defines the switching characteristics of the thin-ferromagnetic-film layer, e.g. of 200 A. in thickness and of 60 percent Ni, 30% Co, 10% Fe, that constitutes the recording medium on magnetic tape 60.

With reference back to FIG. 4 the operation of recording head 10 of FIG. 1 will now be explained With current source 32 coupling the current signal I of FIG. 3*e* of an amplitude 58 to conductive layer 20, as at time $t_0$, and assuming that the magnetization M of magnetizable layers 16, 24 was initially aligned along their respective easy axes 62, 64 as noted by vectors 76, 78, the magnetization M of such layers is caused to rotate away from their easy axes 62, 64 in a counterclockwise, clockwise, respectively, direction into new vector positions 80, 82 respectively. The magnetization M orientations 80, 82 in magnetizable layers 16, 24 coact in the recording gap 84 therebetween in the area of magnetic tape 60 generating a transverse drive field $H_T$ level 86 (FIG. 3*c*) and a longitudinal drive field $H_L$ level 88 (FIG. 3*d*) to generate the resultant field $H_R$ orientation in the recording gap 84 as noted by vector 90*a* of FIG. 3*b*.

When that portion of magnetic tape 60 that was in the recording gap 84 of recording head 10 and that was affected by the resultant field $H_R$ of vector 90*a* passes out from under such recording gap the resultant magnetization M orientation aligns itself in an upward direction with the easy axis 66 as illustrated by vector 92*a* of FIG. 3*a*. This, for purposes of discussion, may be assumed to be the writing of a "0." If a like signal, e.g. "0," is to be written into the next contiguous domain 70*b* as at time $t_1$, current source 32 merely continues coupling its current amplitude 58 to conductive layer 20 whereby the magnetization M of domain 70*b* is caused to be aligned in an upward direction along its easy axis 66 as illustrated by vector 92*b*.

If it is desired to write different digital data, e.g. a "1," in the next contiguous domain 70*c*, pulse source 32 as at time $1t_2$ is caused to couple a current signal I of an amplitude 94 to conductive layer 20 which causes the magnetization M of magnetizable layer 16 to rotate in a counterclockwise direction from its previous vector position 80 through its maximum anisotropy energy position into a new vector position 96 and causes the magnetization M of a magnetizable layer 24 to move from its previous vector position 82 clockwise into a new vector position 98. Current signal I amplitude 94 aligns for a very short while the magnetization M of magnetizable layers 16, 24 essentially orthogonal to the recording surface of magnetic tape 60, as depicted by vectors 96, 98, respectively, whereby the resulting longitudinal drive field $H_L$, with respect to the magnetizable tape 60, is reduced to zero and the transverse drive field $H_T$ is increased to a maximum value 100 which is equal to or greater than the $H_K$ of magnetic tape 60. The resultant sole applied transverse drive field $H_T$ generates the resultant field $H_R$ orientation illustrated by vector 102*b* which is aligned along the longitudinal axis of and transverse to the easy axis 66 of magnetic tape 60.

Figure 5:
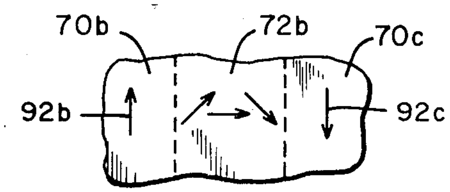
FIG. 5 is a detail illustration of the clockwise rotating vectors in an interdomain Neel walls between contiguous "0," "1" domains.

At time $t_2$ current source 32 is caused to couple a drive current I signal level 104 (of the same magnitude as level 58 but of opposite polarity) to conductive layer 20. Drive current I signal level 104 causes the magnetization of magnetizable layers 16, 24 to rotate in a counterclockwise, clockwise direction assuming the new vector orientations 106, 108, respectively. These magnetization M vector orientations 106, 108 generate the longitudinal drive field $H_L$ intensity 110 and the transverse drive field $H_T$ intensity 112 in the recording gap 84 of recording head 10 generating the resultant field $H_R$ orientation illustrated by vector 90*c*. This consecutive generation of the resultant field $H_R$ orientations of vectors 90*b*, 102*b*, 90*c* generates in interdomain wall 72*b* the resultant magnetization M orientation of the illustrated clockwise rotating vectors more fully detailed in FIG. 5. After domain 70*c* passes from under the recording gap 84 of recording head 10 the resultant field $H_R$ orientation of vector 90*c* generates the resultant magnetization M orientation in magnetic tape 60 aligned along its easy axis 66 in a downward direction as illustrated by vector 92*c*.

If, now, new digital data, a "0," is to be written into magnetic tape 60, as at time $t_5$ current source 32 as at time $4t_5$ is caused to couple to conductive layer 20 a current signal I level 114 (of the same magnitude as level 94 but of opposite polarity) which causes the magnetization M of magnetizable layers 16, 24 to assume the new orientation of vectors 116, 118 respectively. As these magnetization vectors 116, 118 are perpendicular to the recording surface of magnetic tape 60 there is generated in the recording gap 84 of recording head 10 a zero amplitude longitudinal drive field $H_L$ (with respect to magnetic tape 60) and a maximum amplitude 120 transverse drive field $H_T$ equal to or greater than $H_K$ of magnetic tape 60 (of the same magnitude as level 100 but of opposite polarity). The sole, applied transverse drive field $H_T$ generates the resultant field $H_R$ orientation illustrated by vector 102*e*.

Figure 6:
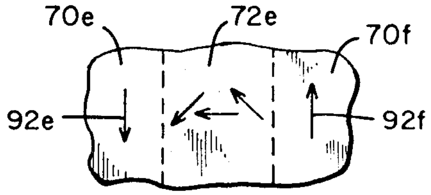
FIG. 6 is a detail illustration of the clockwise rotating vectors in an interdomain Neel wall between contiguous "1," "0" domains.

In a manner similar to that as a time $t_0$, at time $t_5$ current source 32 is caused to couple current signal I level 58 to conductive layer 20. This causes the magnetization M of magnetizable layers 16, 24, to rotate from their previously established vector orientations 116, 118 into the new vector orientations 80, 82, respectively. These vector orientations 80, 82 generate in the area of the recording gap 84 of recording head 10 the longitudinal drive field $H_L$ of an intensity 88 and the transverse drive field $H_T$ of an intensity 86 which coact to generate the resultant field $H_R$ orientation illustrated by vector 90*f*. This consecutive generation of the resultant field $H_R$ orientations of vectors 90*e*, 102*e*, 90*f* generates in interdomain wall 72*f* the resultant magnetization M orientation of the illustrated clockwise rotating vectors more fully detailed in FIG. 6. When domain 70*f* passes out from under the recording gap 84 of recording head 10 the resultant field $H_R$ orientation of vector 90*f* causes the resultant magnetization M orientation in domain 70*f* to be aligned along its easy axis 66 as at vector 92*f* which, as at time $t_0$, is in an upward direction.

Thus, with current source 32 coupling the current signal I waveform of FIG. 3*e* to conductive layer 20 there are generated in the recording gap 84 of recording head 10 the longitudinal drive field $H_L$ and transverse drive field $H_T$ waveforms of FIGS. 3*d* and 3*c* respectively, which generate the resultant field $H_R$ orientation of FIG. 3*b* in such recording gap as illustrated by the corresponding vector orientations. These resultant field $H_R$ orientations of FIG. 3*b* generate the resultant magnetization M orientations of a substantially constant upward or downward vector orientation within the spatially varying distance along the magnetic tape over the respective domain 70 length, changing only during the generating of the interdomain Neel walls 72. The clockwise or counterclockwise rotation of the resultant field $H_R$ orientation and the so-generated resultant magnetization M orientation in magnetic tape 60 are determined by the polarity of the applied current signal I and the skew of the easy axes of the magnetizable layers 16, 24 (and 12, 28) of recording head 10 relative to the tape 60.

What is claimed is:

1. A method high-density magnetic recording using a magnetic recording head having a recording gap this is inductively coupled to a thin-ferromagnetic film of a thickness insufficient to support Bloch walls between adjacent domains and having an easy axis that is parallel to the recording gap, the method comprising:

locating the gap of a magnetic recording head in an inductive relationship with a thin-ferromagnetic film to a thickness insufficient to support Bloch walls but does support Neel walls between adjacent domains and in an orthogonal relationship with the film's direction of relative movement;

moving the film past the recording gap with the film's easy axis being parallel to the recording gap;

generating along the recording gap and in the film a first field that is skewed with respect to the film's easy axis and that is of a first or of a second and opposite polarity which polarity is representative of setting the magnetization of a domain in the film into a first or a second and opposite direction along the film's easy axis;

generating across the recording gap and in the film a second field that is transverse the film's easy axis and that is of a first or of a second and opposite polarity related to the first or second polarity of said first field, respectively;

generating, by the consecutive generation of said first and second fields in the recording gap, a high-density rotating field for establishing in said film interdomain Neel walls that are parallel to the film's easy axis and that rotate in the same magnetic sense in the plane of the film.

2. A method of high-density magnetic recording using a magnetic recording head in which the pole pieces, on opposing sides of a sandwiched conductor, form the recording gap width which recording gap is inductively coupled to a relatively moving recording medium that has a magnetizable layer of a thickness insufficient to support Bloch walls between adjacent domains and an easy axis parallel to said recording gap, the method comprising:

coupling to said conductor a current signal having a first polarity first amplitude;

generating in said recording gap a resultant field $H_R$ intensity skewed with respect to the easy axis in said recording medium, the magnetization M of a first domain in said recording medium in said recording gap oriented in a skewed direction corresponding to the skewed direction of said resultant field $H_R$;

coupling to said conductor a current signal having a first polarity second amplitude, greater than said first polarity first amplitude;

generating in said recording gap a resultant field $H_R$ intensity normal to the easy axis in said recording medium;

orienting the magnetization M of the trailing edge of said first domain in a direction corresponding to the direction of said resultant field $H_R$;

coupling to said conductor a current signal having a second polarity first amplitude;

generating in said recording gap a resultant field $H_R$ intensity skewed with respect to the easy axis in said recording medium;

orienting the magnetization M of a second domain of said recording medium in said recording gap in a direction corresponding to the direction of said resultant field $H_R$;

establishing in the trailing edge of said first domain, between said first and second domains, an interdomain Neel wall in which the magnetizations have a given continuous rotational sense;

coupling to said conductor a current signal having a second polarity second amplitude, greater than said second polarity first amplitude generating in said recording gap a resultant field $H_R$ intensity normal to the easy axis in said recording medium;

orienting the magnetization M of the trailing edge of said second domain in a direction corresponding to the direction of said resultant field $H_R$;

coupling to said conductor a current signal having said first polarity first amplitude;

generating in said recording gap a resultant field $H_R$ intensity skewed with respect to the easy axis in said recording medium;

orienting the magnetization M of a third domain of said recording medium in said recording gap in a direction corresponding to the direction of said resultant field $H_R$;

establishing in the trailing edge of said second domain between said second and third domains, a second interdomain Neel wall in which the magnetizations have the same given continuous rotational sense as in said first interdomain Neel wall.

3. A method of high-density magnetic recording using a magnetic recording head in which the pole pieces, on opposing sides of the conductor that forms the recording gap width, have easy axes that are equally skewed with respect to the recording face and are transverse to each other and which recording gap is inductively coupled to a relatively moving recording medium having a magnetizable layer of a thickness insufficient to support Bloch walls between adjacent domains and an easy axis parallel to said recording gap, the method comprising:

coupling to said conductor a current signal having a first polarity first amplitude rotating the magnetization M of said pole pieces in counterclockwise, clockwise directions out of alignment with their respectively skewed easy axes;

generating in said recording gap transverse drive field $H_T$ and longitudinal drive field $H_L$ intensities;

generating in said recording gap a resultant field $H_R$ intensity skewed with respect to the easy axis in said recording medium, the magnetization M of a first portion of said recording medium in said recording gap oriented along its easy axis in a skewed direction corresponding to the skewed direction of said resultant field $H_R$;

coupling to said conductor a current signal having a first polarity second amplitude, greater than said first polarity first amplitude;

rotating the magnetizations M of said pole pieces in counterclockwise clockwise directions normal to said recording medium;

generating in said recording gap a transverse drive field $H_T$ intensity;

generating in said recording gap a resultant field $H_R$ intensity normal to said recording gap and transverse the easy axis in said recording medium;

orienting the magnetization M of the trailing edge of said first portion of said recording medium in a direction corresponding to the direction of said resultant field $H_R$;

coupling to said conductor a current signal having a second polarity first amplitude;

rotating the magnetizations M of said pole pieces in counterclockwise, clockwise directions out of alignment with their respectively skewed easy axes;

generating in said recording gap transverse drive field $H_T$ and longitudinal drive field $H_L$ intensities;

generating in said recording gap a resultant field $H_R$ intensity skewed with respect to the easy axis in said recording medium;
orienting the magnetization M of a second portion of said recording medium in said recording gap in a direction corresponding to the direction of said resultant field $H_R$;
establishing in said recording medium in the trailing edge of said first portion, between said first and second portions, an interdomain Neel wall in which the magnetizations have a given continuous rotational sense;
coupling to said conductor a current signal having a second polarity second amplitude, greater than said second polarity first amplitude;
rotating the magnetizations M of said pole pieces in counterclockwise, clockwise directions normal to said recording medium;
generating in said recording gap a transverse drive field $H_T$ intensity;
generating in said recording gap a resultant field $H_R$ intensity normal to said recording gap and transverse the easy axis in said recording medium;
orienting the magnetization M of the trailing edge of said second portion of said recording medium in a direction corresponding to the direction of said resultant field $H_R$:
coupling to said conductor a current signal having said first polarity first amplitude;
rotating the magnetizations M of said pole pieces in counterclockwise, clockwise directions out of alignment with their respectively skewed easy axes;
generating in said recording gap transverse drive field $H_T$ and longitudinal drive field $H_L$ intensities;
generating in said recording gap a resultant field $H_R$ intensity skewed with respect to the easy axis in said recording medium;
orienting the magnetization M of a third portion of said recording medium in said recording gap in a direction corresponding to the direction of said resultant field $H_R$;
establishing in said recording medium in the trailing edge of said second portion between said second and third portions a second interdomain Neel wall in which the magnetizations have the same given continuous rotational sense as in said first interdomain Neel wall.

UNITED STATES PATENT OFFICE
CERTIFICATE OF CORRECTION

Patent No. 3,611,417 Dated October 5, 1971

Inventor(s) Gerald F. Sauter et al.

It is certified that error appears in the above-identified patent and that said Letters Patent are hereby corrected as shown below:

Column 5, line 17, "this" should read -- that --; lines 18 and 23, "thin-ferromagnetic film", each occurrence, should read -- thin-ferromagnetic-film --.

Signed and sealed this 12th day of September 1972.

(SEAL)
Attest:

EDWARD M.FLETCHER,JR.
Attesting Officer

ROBERT GOTTSCHALK
Commissioner of Patents